July 2, 1963  E. E. FOSTER  3,095,779
FILM MAGAZINE AND DRIVE MEANS THEREFOR
Filed June 22, 1959  4 Sheets-Sheet 1
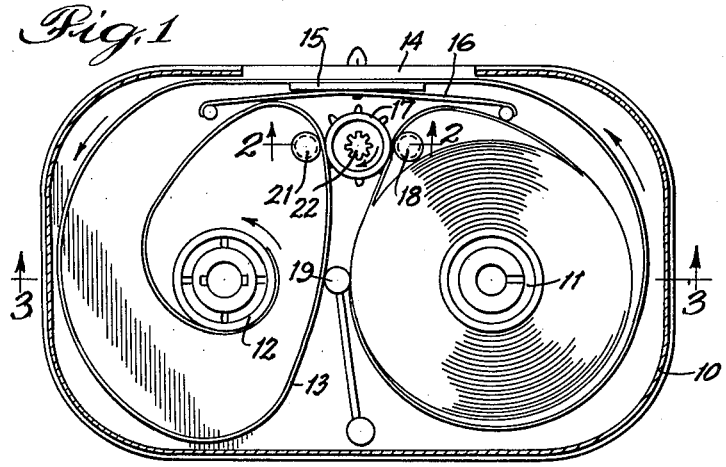
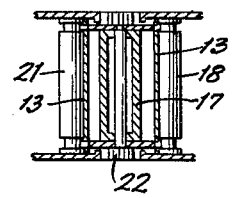
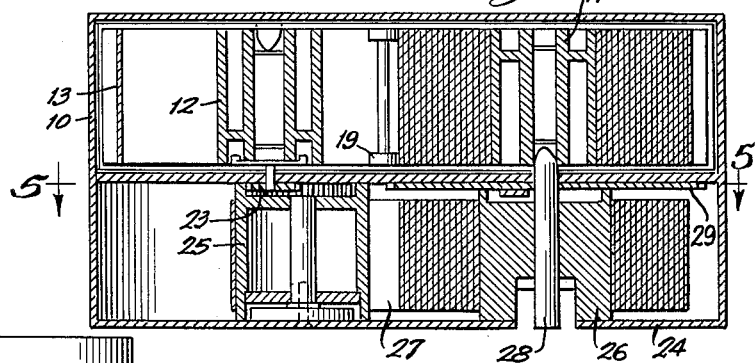
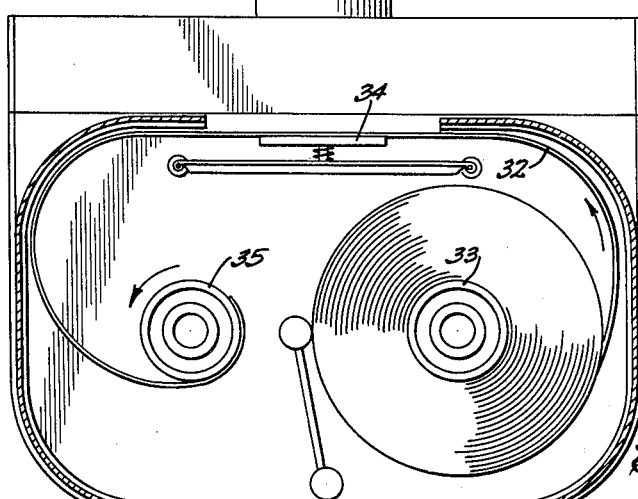
INVENTOR:
Edwin E. Foster,
BY Blair, Freeman & Molinare
ATTORNEYS.

July 2, 1963 E. E. FOSTER 3,095,779
FILM MAGAZINE AND DRIVE MEANS THEREFOR
Filed June 22, 1959 4 Sheets-Sheet 2
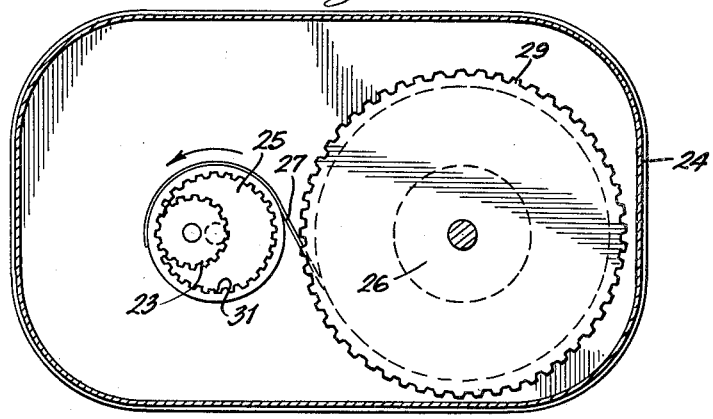
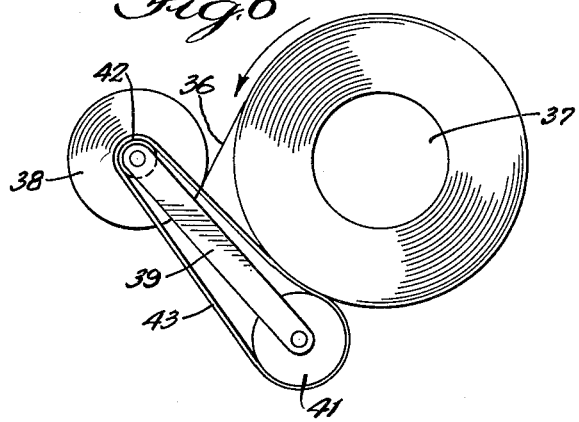
INVENTOR:
Edwin E. Foster,
BY Blair Freeman & Molinare
ATTORNEYS.

July 2, 1963 E. E. FOSTER 3,095,779
FILM MAGAZINE AND DRIVE MEANS THEREFOR
Filed June 22, 1959 4 Sheets-Sheet 3
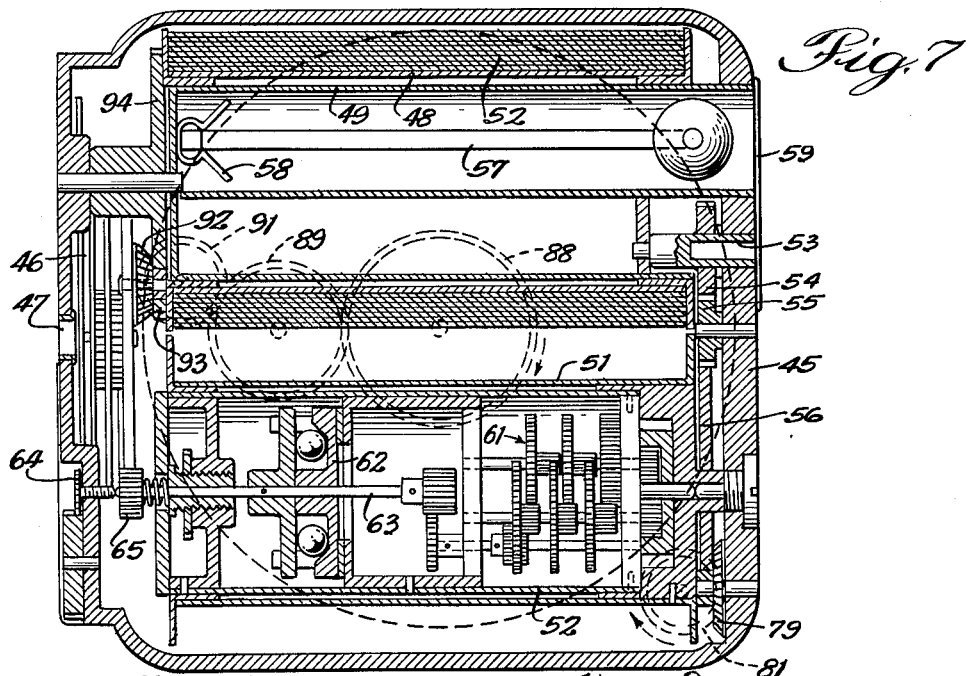
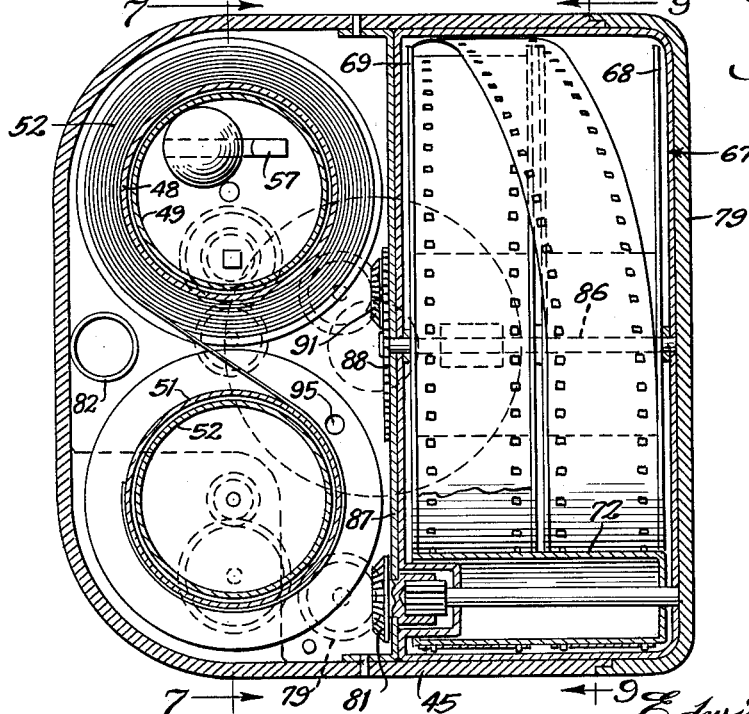
INVENTOR:
Edwin E. Foster,
BY Blair, Freeman & Molinare
ATTORNEYS.

July 2, 1963 E. E. FOSTER 3,095,779
FILM MAGAZINE AND DRIVE MEANS THEREFOR
Filed June 22, 1959 4 Sheets-Sheet 4

INVENTOR:
Edwin E. Foster,
BY Brie Freeman & Molinare
ATTORNEYS.

United States Patent Office 3,095,779
Patented July 2, 1963

3,095,779
FILM MAGAZINE AND DRIVE MEANS THEREFOR
Edwin E. Foster, Austin, Tex.
Filed June 22, 1959, Ser. No. 821,981
7 Claims. (Cl. 88—17)

This invention relates to film magazines and drive means therefor, and more particularly to film magazines and drive means for use in spring driven motion picture cameras.

In motion picture cameras using film magazines the magazine has generally been constructed to provide a high spring pressure on the film at the film guide or gate with the take-up spool being driven through a friction clutch so that the take-up spool will not pull the film through the gate. This means that the driving motor for the camera must exert a relatively high torque so that a spring motor of practical size requires several windings to run an entire reel of film. It has long been recognized that it would be highly desirable to provide a camera in which an entire reel of film can be run with a single winding but practical limitations as cameras were heretofore constructed have made this impossible.

It is, therefore, one of the objects of the present invention to provide a magazine type movie camera in which a spring motor for operating the camera can run an entire reel of film with a single winding.

Another object is to provide a film magazine in which the friction in the film guide or gate is reduced to a minimum without danger that the take-up spool will pull the film therethrough.

Still another object is to provide a film magazine in which the film drivably engages a sprocket between each of the spools and the film guide or gate to insure that film will travel from the supply spool and on to the take-up spool at the same rate it travels through the gate.

According to a feature of the invention, the sprocket is driven positively at a rate of speed proportional to the rate of movement of film through the gate and the take-up spool is driven to wind the film thereon.

A further object of the invention is to provide a camera in which the take-up spool is driven by the spring motor at a variable speed proportional to the lineal speed of the spring.

According to a feature of the invention the spring motor includes a storage spool and a power spool with a spring strip biased to coil on to the storage spool and connected to the power spool to be back wound thereon. The power spool is connected to the gate to advance the film therethrough and the take-up spool is connected to the motor to be driven thereby at variable speed proportional to the change in effective diameter of the take-up spool as the film is wound thereon.

In one desirable arrangement the take-up spool is directly drivably connected to the storage spool of the spring motor. In another desirable arrangement the take-up spool is driven through a roller or belt drivably engaging the outer turn of the spring strip.

A still further object is to provide a very compact arrangement by which maximum film and spring capacities are provided in minimum space.

The above and other objects and features of the invention will be more readily apparent from the following description when read in connection with the accompanying drawings, in which:

FIGURE 1 is a top view of a magazine embodying the invention with the top cover plate cut away;

FIGURE 2 is a partial section of the line 2—2 of FIGURE 1;

FIGURE 3 is a section on the line 3—3 of FIGURE 1 illustrating the film magazine mounted in a camera;

FIGURE 4 is a view of an alternative film magazine construction similar to FIGURE 1;

FIGURE 5 is a view of the spring motor for the camera taken substantially on the line 5—5 of FIGURE 3;

FIGURE 6 is a partial view similar to FIGURE 5 showing an alternative arrangement;

FIGURE 7 is a sectional view through an alternative camera construction embodying the invention on the line 7—7 of FIGURE 8;

FIGURE 8 is a section at right angles to FIGURE 7;

Figure 9:
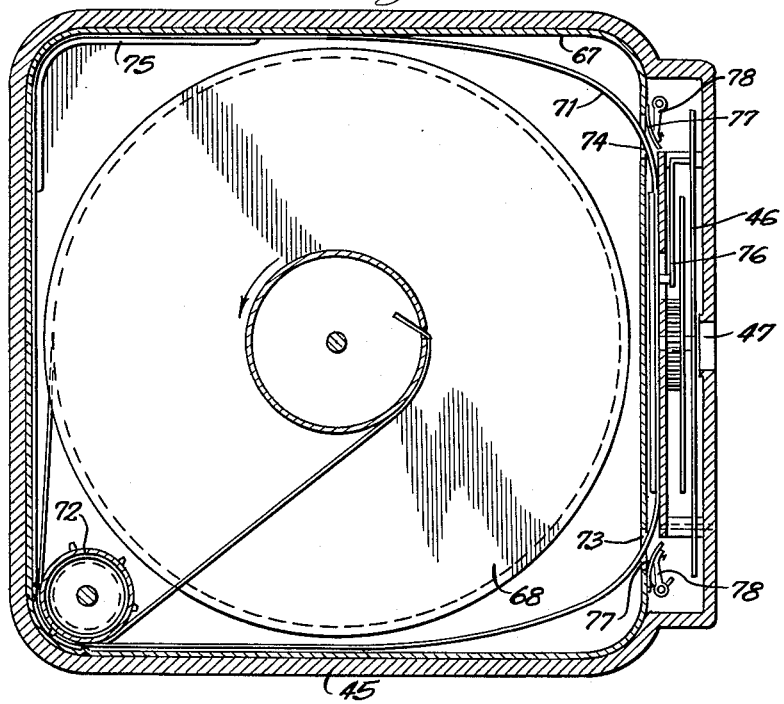
FIGURE 9 is a section on the line 9—9 of FIGURE 8.

The film magazine, as best seen in FIGURES 1 to 3, comprises a casing 10 which may be of sheet metal or sheet plastic material in which a storage spool 11 and a take-up spool 12 are mounted. An elongated strip of film shown at 13 is normally stored on the storage spool 11 and is wound on to the take-up spool 12 during operation of the camera.

The magazine is provided with the usual film guide or gate structure indicated generally at 14 through which the film passes in traveling from the storage spool to the take-up spool. As illustrated, the film guide or gate includes a pressure plate 15 bearing against the film and urged into engagement with the film by a spring 16. The gate also provides the usual film-feeding means operated from the camera itself to advance the film in step-by-step fashion past the gate as the frames are exposed one at a time, and may include a cover, not shown, to close the gate opening when the magazine is removed from the camera.

According to the present invention, a sprocket wheel 17 is provided underlying the gate and between the spools 11 and 12. The film from the storage spool 11 passes first into engagement with the sprocket wheel and is held in engagement therewith by a guide roller 18 which is grooved near its ends to permit the pins on the sprocket wheel to penetrate the openings in the film as best seen in FIGURE 2. After passing over the sprocket wheel the film passes between a retaining arm 19 and the storage spool and then through the gate. The film at the exit side of the gate is formed into a relatively large loose loop and then passes again into engagement with the sprocket wheel and between the sprocket wheel and the guide roller 21 similar to the guide roller 18 before passing on to the take-up spool 12. The sprocket 17 is provided at each end with a driving gear 22 which projects through openings in the sides of the magazine casing to be drivably engaged by a driving gear in the motor mechanism. The take-up spool 12 as best seen in FIGURE 3 is also provided with a driving gear 23 to mesh with a gear on the spring motor so that both the take-up spool and the sprocket will be driven by the spring motor during operation of the camera.

With the film magazine construction as so far described the pressure against the film at the gate may be made very light on the order of that normally employed with a conventional spool camera and substantially lighter than that normally used in a film magazine. The take-up spool is provided with a slipping clutch as is conventional practice, but in this instance the clutch may be made quite light so that it will slip easily without exerting a high force on the film. Engagement of the film on opposite sides of the gate with the sprocket 17 insures that the film will travel from the storage spool through the gate and on to the take-up spool at the same lineal speed. If the take-up spool tends to wind up the film faster than it is traveling past the sprocket, it can exert a tension through the film only on the sprocket and can under no circumstances tend to pull the film through the gate at a rate higher than normal rate of travel of film through the gate. This enables the pressure on the film at the gate to be reduced so that the torque required to advance the film is reduced and a spring motor can be employed which exerts considerably less torque than is normally required in magazine cameras. Therefore, the same motor can be geared to advance the film a substantially greater distance than in conventional magazine cameras even to the extent of running a complete reel on a single winding.

The camera is driven by a spring motor more particularly illustrated in FIGURES 3 and 5 which may be mounted in the camera casing as indicated generally at 24 immediately beneath the film magazine. The spring motor comprises a spring storage spool 25 and a power spool 26 mounted on spaced parallel axes in the camera housing 24. A spring strip 27 is anchored at its opposite ends to the spools 25 and 26 and is normally biased so that it tends to coil relatively tightly on the storage spool 25. The spring strip may be constructed as more particularly described and claimed in my copending application Serial No. 640,923, filed February 18, 1957, now Patent No. 2,869,801, and is connected to the power spool so that when the motor is wound it will be back wound on the power spool and will drive the power spool with a substantially uniform torque throughout the full motor operation. The spring may be wound through a suitable key or the like connected to a projecting end of the power spool axes as shown at 28 in FIGURE 3.

The power spool has a main driving gear 29 drivably secured thereto and the driving gear meshes with gearing in the camera itself, not shown, which drives the shutter, the film feed mechanism, and the sprocket 17. It will be understood that the speeds of these several parts are properly synchronized so that the shutter will operate when the film is stationary and the film will be fed in a step-by-step manner at a rate of speed synchronized with the rate at which the film is advanced by the sprocket 17.

The take-up spool 12 is preferably driven at a variable speed which varies in proportion to the effective diameter of the take-up spool as the film is wound thereon so that the take-up spool will always be driven at the correct speed without causing any slipping of the driving means therefor. For this purpose, as shown, the storage spool 25 of the spring motor is formed with an internal gear surface 31 which meshes with the driving gear 23 for the take-up spool. In operation of the spring motor the storage spool 25 is not capable of delivering a very high torque but I have found that it can be utilized to drive the take-up spool 12 without interfering with proper operation of the spring motor.

In operation of the unit when the spring is fully wound on the power spool 26 as shown in FIGURES 3 and 5, and the film is fully wound on the storage spool 11 as shown in FIGURES 1 and 3, both the take-up spool 12 and the storage spool 25 will be at minimum diameters. As the camera runs, the effective diameters of the take-up and storage spools will increase at approximately proportional rates so that when they are turning at proportional speeds the film will be wound on the take-up spool at the correct rate to avoid excessive tightening or excessive looping of the film. Since the power spool 26 is maintained at a constant rate of revolution during camera operation by the usual camera governor mechanism, the speed of the storage spool 25 will become gradually slower and slower as the spring winds thereon to turn the take-up spool 12 at a slower and slower speed to accommodate for its effective increase in diameter. Therefore, with a spring motor drive as described in the film take-up spool can be driven directly from the spring supply spool without the intervention of any slipping clutches whatever and the entire reel of film can be run with a single winding of the spring.

The spring drive as described may be applied also to a film magazine as shown in FIGURE 4. In a magazine of this type the film as illustrated at 32 passes directly from a storage spool 33 through the film guide or gate mechanism 34 and directly on to the take-up spool 35. Since the speed of the take-up spool is varied proportionately to its effective change of diameter, the film will never be pulled through the gate or will never be allowed to accumulate excessive slack. Therefore, a gate with a very light spring pressure can be utilized by providing the take-up spool with the variable speed drive of the invention.

FIGURE 6 illustrates an alternative variable speed drive which may be used in place of that shown in FIGURES 3 and 5. As illustrated in FIGURE 6, a spring strip 36 is connected to a power spool 37 and a storage spool 38 to be back wound on the power spool in the same manner as the spring of FIGURES 3 and 5. In this case the storage spool is freely rotatable and an arm 39 is pivoted to swing about the axis of the storage spool. The arm carries a relatively large roller 41 at its free end and a smaller roller 42 coaxial with its pivot and a belt 43 is trained over the rollers. The arm is urged in a counterclockwise direction as seen in FIGURE 6 by a spring, not shown, so that the belt and the roller 41 will normally press against the outer turn of the spring on the power spool 37. The roller 42 may be drivably connected to the film take-up spool such as the spool 12 through suitable driving connecting means.

In operation of this spring motor the lineal speed of the spring strip will be greater during the initial operation than toward the end of the operation due to the fact that the power spool is turning at the same rotational speed and its effective diameter is decreasing during operation. Through engagement of the belt or roller with the spring strip the roller 42 and the film take-up spool will be driven at a continuously decreasing rate of rotation during the operation which will vary in proportion to the increase in effective diameter of the film take-up spool. The spring motor of FIGURE 6, therefore, produces the same results as the spring motor of FIGURES 3 and 5 to drive the film take-up spool at a variable speed such that it will take up the film properly without tending to pull it through the gate or without permitting excessive slack to accumulate therein.

FIGURES 7, 8, 9 and 10 illustrate an alternative arrangement in which the spring is so constructed that a single winding thereof will run a complete 100 foot reel of film without requiring any intermediate rewinding and in which the parts are so arranged as to provide an extremely compact camera and film magazine. The complete camera, as shown, comprises a casing 45 which may be constructed of metal or plastic, as desired, and which carries a shutter mechanism 46 at one end controlling an aperture 47 over which lenses can be positioned as desired. The shutter mechanism is driven by a spring motor, as best seen in FIGURES 7 and 8, which comprises a storage drum 48 which is preferably hollow and is supported for rotation on a sleeve 49 fixedly mounted in the camera casing. A power drum 51 is similarly mounted for rotation on a tubular sleeve 52 fixedly mounted in the camera parallel to and spaced from the sleeve 49. The storage and power drums, as seen in FIGURE 8, lie at one side of the casing with their axes in a plane parallel to the end wall of the casing and occupy approximately one-half of the interior space of the casing. The drums extend substantially the full depth of the casing, as shown.

A spring strip is coiled on the storage drum and is biased so that when released it will coil on the storage drum in the same manner as the spring strips described above. The end of the spring strip is connected to the power drum 51, as shown in FIGURE 8, to be back wound thereon when the spring motor is wound up so that the strip will tend to rewind onto the storage drum and will deliver power during this operation. It will be noted that the spring strip is relatively wide and is relatively short. This is important in order that sufficient power can be delivered to run a 100 foot spool or magazine of film while maintaining a very highly uniform torque throughout the full operation. In one very desirable construction, the spring strip is .008 inch thick, 3 inches wide and 15 feet long and with drums 1¼ inches in diameter will effect 31 turns in a single winding at a very high uniform torque.

For winding the spring, a socket 53 opens at the end of the casing to receive a winding crank and carries a gear 54 meshing through an intermediate gear 55 with a gear 56 connected to the power drum 51. For winding, a crank, as shown at 57, may be inserted in the socket 53 and turned to turn the power drum in a direction to back wind the spring strip 52 thereon. The crank may conveniently be housed in the sleeve 49, suitable brackets being provided for this purpose, as shown at 58, and the end of the housing through which the crank is inserted and moved may conveniently be closed by a movable cover 59. In this way, after the spring motor is wound, the crank may be stored in the sleeve where it is out of the way and will not interfere with operation of the camera.

The power drum is connected to the shutter mechanism through a reduction gear set, indicated generally at 61, and which is completely housed in the tubular sleeve 52 on which the power drum is mounted. The speed control governor 62 may also be housed conveniently in the power drum and may drive an output shaft 63 which abuts against a speed adjusting screw 64 in the front end of the housing by means of which the film speed may be adjusted in a known manner. The gear train 61 drives through the governor and drives a pinion 65 which is geared to the shutter mechanism 46 to operate it when the shutter is released for operation by the usual manual control button, as shown at 66 in FIGURE 10. It will be apparent that the exact form of reduction gearing may be varied as desired and that the shutter mechanism may be of conventional construction operating in a conventional manner and it will therefore not be described in detail herein. The film is supplied to the camera in a magazine, indicated generally at 67, which encloses two spools 68 and 69 in coaxial side-by-side relationship, but mounted for rotation independently of each other. As seen in FIGURE 9, a film strip 71 may pass from one of the spools over a double sprocket member 72 and through an opening 73 at one end of the magazine near a corner thereof. The film then passes outside of the magazine where it may be fed through the shutter mechanism 46 and reenters the magazine through a similar opening 74 in the same end of the magazine. The film then passes over a guide 75 in a corner of the magazine spaced along the same wall thereof as the sprocket 72 and again over the sprocket and onto the other film spool 68. The small stretch of film lying outside of the magazine casing may be threaded into the shutter mechanism in much the same manner as in a conventional spool camera and will be fed by a film feed dog 76 forming a part of the shutter mechanism. The openings 73 and 74 in the magazine are normally closed by flexible closures 77 which, when closed, will seal the magazine cover against ingress of light. When the magazine is inserted into the camera casing operating buttons on the closure 77 may be engaged by pivoted fingers 78 which will be swung when the removable closure on the end of the film magazine, as shown at 79 in FIGURE 8, is replaced on the camera casing in a direction to open the closures 77. In this way, the magazine is maintained closed until it has been inserted in the camera casing and the camera casing is again closed so that the only portion of the film ever exposed to light in handling of the magazine is the relatively few inches which extends between the openings 73 and 74 on the outside of the magazine casing.

Figure 10:
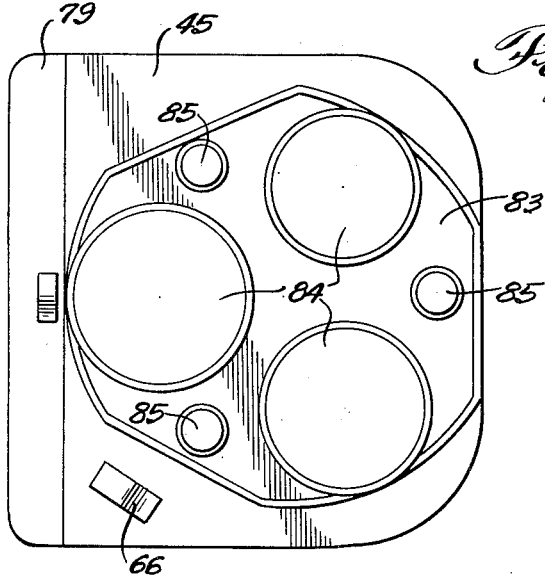
FIGURE 10 is a front view of the camera of FIGURES 7 to 9.

The sprocket 72 is driven at a speed synchronous with the speed of the shutter so that the film will always be fed accurately from the storage spool onto the takeup spool at the correct speed and cannot be pulled through the shutter by the takeup spool or cannot impose undue restriction on the feed of the film by the feed dog 76. For this purpose, as shown in FIGURES 7 and 8, the gear 56 drives a small pinion which is connected to a bevel pinion 79. The bevel pinion 79 in turn meshes with a bevel pinion 81 secured to the sprocket 72 to drive it. With the arrangement of the spring motor, as shown, there is a space provided between the motor storage and takeup spools and at one side of the plane in which their axes lie which is open for viewing. This space is utilized to house a viewing tube 82, as seen in FIGURE 8, which may extend completely through the camera casing to open at the forward end thereof. This arrangement lends itself readily to turret mounting of lenses, as shown in FIGURE 10. As there illustrated, a turret 83 is rotatably mounted on the front of the camera casing and carries three lenses 84 which may be moved selectively into registration with the exposure opening 47 as the turret is turned. The turret also carries three viewing lenses 85 which will register selectively with the viewing tube 82 at the right side of the camera casing, as seen in FIGURE 10, as the turret is turned. Viewing lenses will, of course, be designed to provide a proper view corresponding to the object lens then in registration with the exposure opening so that the operator will see through the tube 82 and the viewing lens in registration therewith the same view which will be photographed by the object lens then in registration with the exposure aperture.

The takeup spool in this arrangement is preferably driven at variable speed by the spring motor in substantially the same manner as in the embodiments of FIGURES 1 to 6. As shown, the takeup spool 68 is secured to a shaft 86 which extends loosely through the center of the storage spool 69. The shaft projects beyond the end of the magazine housing and is provided with splines thereon which will extend through an opening in a partition 87 separating the spring motor compartment from the film compartment and will engage in a splined opening in a gear 88 rotatably mounted on the partition. The gear 88, as seen in FIGURE 7, meshes with an idler pinion 89 which in turn meshes with a bevel gear 91 also mounted on the partition 87. The bevel gear 91 meshes with a bevel gear 92 which is formed with a small straight pinion section 93 meshing with a gear 94 carried by the storage drum 48. Through this gear train the takeup spool 68 for the film will be driven at a variable decreasing speed as the film is run in the same manner as described above in connection with FIGURES 1 to 3 so that no slipping clutches are necessary to drive the takeup film spool.

The amount of film remaining may be indicated in the same manner as described in connection with FIGURE 1 by a follower roller 95, as shown in FIGURE 8, which is pivotally mounted to engage the spring wound on the power drum 51. When the motor is fully wound, corresponding to a full film magazine, the roller 95 will be moved outward from the drum 51 and an indicator, not shown, operated thereby may be set to indicate that the camera contains 100 feet of unexposed film. As the motor is run to expose the film, the effective diameter of the power drum will decrease and the roller 95 will follow it to operate the indicator in the same manner described above so that the amount of unexposed film and remaining effective spring power in the camera will at all times be accurately indicated.

The arrangement of FIGURES 7 to 10 provides an extremely compact and highly efficient magazine camera and is for this reason highly desirable. This is made possible by utilizing a spring motor of the type disclosed employing a very wide relatively short spring which can be compactly mounted to provide an extremely high torque over a relatively small number of turns. By utilizing a spring strip of the type more particularly disclosed and claimed in my copending application Serial No. 595,290 filed July 2, 1956, now Patent No. 2,899,193, or as shown in my Patent No. 2,609,193, the torque delivered by the spring motor throughout the full operation thereof may be maintained extremely uniform.

While several embodiments of the invention have been shown and described in detail, it will be understood that they are for the purpose of illustration only and are not intended as a definition of the scope of the invention, reference being had for this purpose to the appended claims.

What is claimed is:

1. In a moving picture camera, a film magazine comprising a casing, a film supply spool and a film takeup spool in the casing, the film passing from the supply spool past an exposure point and onto the takeup spool, a sprocket engaging the runs of film between the respective spools and the exposure point to insure movement of the film from one of the spools and onto the other spool at the same rate, a spring motor including a storage spool for the spring, a power spool and a spring strip normally biased to coil onto the storage spool and connected to the power spool to be back wound thereon, means connecting the power spool drivably to the sprocket to drive it at a constant speed, and means forming a positive driving connection between the spring storage spool and the film takeup spool to drive the film take-up spool at varying angular speeds as the effective diameters of the spring storage spool and the film takeup spool change thereby to wind the film onto the film take-up spool at a constant lineal rate.

2. In a moving picture camera, a film supply spool, a film take-up spool, the supply spool having a length of film thereon to be wound on the take-up spool during operation of the camera, a spring motor including a storage spool, a power spool and a spring strip normally biased to coil onto the storage spool and connected to the power spool to be back wound thereon, driving means connected to the power spool and drivably connected to the camera to advance the film at a constant speed from the supply spool to the take-up spool, and positive variable speed driving means connecting the spring motor to the take-up spool and positively driving it angularly at angular speeds proportional to the lineal speed of the spring strip in moving from the power spool to the storage spool and which vary as the effective diameters of the spring storage spool and the film takeup spool change thereby to wind the film onto the film takeup spool at a constant lineal rate.

3. In a moving picture camera, a film supply spool, a film take-up spool, the supply spool having a length of film thereon to be wound on the take-up spool during operation of the camera, a spring motor including a storage spool, a power spool and a spring strip normally biased to coil onto the storage spool and connected to the power spool to be back wound thereon, driving means connected to the power spool and drivably connected to the camera to advance the film at a constant speed from the supply spool to the take-up spool and a positive driving connecttion from the spring storage spool to the film take-up spool to drive the film takeup spool at varying angular speeds and the effective diameters of the spring storage spool and the film take-up spool change thereby to wind the film onto the film take-up spool at a constant lineal rate.

4. In a moving picture camera, a film supply spool, a film take-up spool, the supply spool having a length of film thereon to be wound on the take-up spool during operation of the camera, a spring motor including a storage spool, a power spool and a spring strip normally biased to coil onto the storage spool and connected to the power spool to be back wound thereon, driving means connected to the power spool and drivably connected to the camera to advance the film at a constant speed from the supply spool to the take-up spool, and driving means for the take-up spool including an element drivably engaging the outer turn of spring strip on the power spool to be driven thereby and connected to the film takeup spool to drive it at varying angular speeds which vary as the effective diameters of the power spool and the film takeup spool change thereby to wind the film onto the film takeup spool at a constant lineal rate.

5. A camera comprising a casing, hollow cylindrical spring motor storage and power spools mounted in side-by-side relationship in the casing with their axes spaced and parallel and extending substantially the full length thereof, a spring strip of a width substantially equal to the length of the spools and biased to coil on the storage spool and connected to the power spool to be back wound thereon, film supply and takeup spools mounted in the casing side-by-side on a common axis perpendicular to the axes of the spring motor spools, means to feed film from the supply spool at a constant speed to the take-up spool, a driving connection from the power spool to the last named means, and positive variable speed driving means connecting the spring motor to the takeup spool and positively driving it angularly at angular speeds proportional to the lineal speed of the spring strip in moving from the power spool to the storage spool and which vary as the effective diameters of the spring storage spool and the film takeup spool change thereby to wind the film onto the film takeup spool at a constant lineal rate.

6. The camera of claim 5 in which the first named driving connection includes gearing in the hollow power spool.

7. The camera of claim 5 in which the positive variable speed driving means is a positive driving connection between the motor storage spool and the film take-up spool.

References Cited in the file of this patent

UNITED STATES PATENTS

| | | |
|---|---|---|
| 1,369,127 | Ray | Feb. 22, 1921 |
| 1,372,675 | Davis | Mar. 29, 1921 |
| 1,884,169 | Owens | Oct. 25, 1932 |
| 1,942,891 | Wittel | Jan. 9, 1934 |
| 2,082,505 | Moomaw | June 1, 1937 |
| 2,174,529 | Proctor | Oct. 3, 1939 |
| 2,201,886 | Dalotel | May 21, 1940 |
| 2,241,232 | Wittel | May 6, 1941 |
| 2,293,195 | Cohen | Aug. 18, 1942 |
| 2,323,576 | Sperry | July 6, 1943 |
| 2,466,524 | Williams | Apr. 5, 1944 |
| 2,568,339 | Jacobson | Sept. 18, 1951 |
| 2,651,964 | Doyle | Sept. 15, 1953 |
| 2,673,694 | Howell | Mar. 30, 1954 |
| 2,908,208 | Michatek et al. | Oct. 13, 1959 |